United States Patent [19]

Beall

[11] Patent Number: 4,473,477

[45] Date of Patent: Sep. 25, 1984

[54] METHOD OF ORGANIC WASTE DISPOSAL

[75] Inventor: Gary W. Beall, Austin, Tex.

[73] Assignee: Radecca, Inc., Austin, Tex.

[21] Appl. No.: 419,302

[22] Filed: Sep. 20, 1982

Related U.S. Application Data

[63] Continuation-in-part of Ser. No. 307,300, Sep. 30, 1981, abandoned.

[51] Int. Cl.³ .............................................. B01D 15/00
[52] U.S. Cl. .................................... 210/691; 210/747; 210/751
[58] Field of Search ............... 210/679, 680, 691, 747, 210/751, 170, 908–910, 924; 252/428, 430

[56] References Cited

U.S. PATENT DOCUMENTS

| 4,070,282 | 1/1978 | Otto ..................................... 210/665 |
| 4,149,968 | 4/1979 | Kupiec et al. ........................ 210/751 |
| 4,167,481 | 9/1979 | Cremers et al. ..................... 210/679 |
| 4,276,164 | 6/1981 | Martone et al. .................... 210/170 |

Primary Examiner—Ivars C. Cintins
Attorney, Agent, or Firm—Stefan J. Klauber

[57] ABSTRACT

A method for controlling and containing organic material by sorbing it into an organoclay. Solid or liquid waste material or waste material in aqueous solution containing organic material are combined with a sufficient amount of organoclay to sorb and contain the organic material in the organoclay.

18 Claims, 10 Drawing Figures

METHOD OF ORGANIC WASTE DISPOSAL

RELATED APPLICATIONS

This application is a continuation-in-part of my co-pending application Ser. No. 307,300, filed on Sept. 30, 1981, and entitled "ORGANOCLAY WASTE DISPOSAL METHOD", now abandoned. The entire disclosure of this parent application is incorporated herein by reference.

BACKGROUND OF INVENTION

1. Field of the Invention

This invention relates to a method for disposing of waste fluids containing organic wastes and, more particularly, relates to a method for preventing escape of organic waste material from a waste disposal site.

2. Prior Art

One of the major problems facing cities, chemical manufacturers, and industries using various chemicals is waste disposal. More particularly, cities and industries are often faced with the disposal of mixtures and/or emulsions of organic contaminants. Typically, these are aqueous compositions, however, there exists waste fluids which are compositions of organic contaminants and polar fluids. In many of these operations, the disposal of water containing the contaminant substances is a problem. Regulations make it impossible to simply dump such waste water into streams, even if such method of disposal were desirable. Various methods have been proposed for removing such contaminants from waste water, but they have been relatively expensive or inefficient. Theerefore, the removal of the contaminants from aqueous solutions, and in particular from waste water containing small amounts, is a problem which has not been completely solved.

One method in common use for organic waste disposal, utilizes waste disposal sites. Current such methods generally call for burying organic-containing waste in a lined area of containment to attempt to physically isolate the waste from any surface or ground water near the disposal site. These methods often include the use of polymer liners, bentonite liners, and bentonite-polymer liners (e.g. Vol clay) for the site. These techniques, however, suffer from two major problems. First, it is extremely difficult, if not impossible, to engineer a waste disposal site without having leaks occur in the engineered barriers either during initial implacement, or with time as the engineered barriers age. In the case of polymer liners, the problem of initial implacement is a major drawback since it is difficult to manufacture large sheets of synthetic liners that have no leaks, and because the sheets have finite sizes and must be sealed in the field. This sealing operation is very difficult to accomplish without leaks. One additional problem is that the presently used synthetic liners are also susceptible to puncture. A further major problem with polymers, is that after a finite period, sometimes within five to ten years, the polymer may begin to degrade badly, and to crack and rupture.

The bentonite and betonite-polymer mixtures overcome some of the problems associated with polymeric liners. A problem with the clay liners is that in order to form the water impermeable layer, the swelling properties of the bentonite are of special significance. These properties, unfortunately, are a strong function of ground-water salinity and of wetting and drying cycles. Leaks in bentonite liners can be caused by ground water composition in at least two ways. If the salinity of the ground water or leachate is high, the swelling properties of the clay may be drastically altered. Secondly, if the ground water or leachate has a high content of divalent metals such as calcium or magnesium, again the swelling properties and thus the permeability of the clay may be drastically altered. Leaks can also occur through repeated cycles of wetting and drying that allow cracks to form in the liner. This will be the case in most landfills where the site is located in the unsaturated soil zone.

Bentonite clay liners have also been shown to be very sensitive to some organics. It has been shown that bentonite liners undergo dehydration reactions when exposed to organics such as acetone that result in cracking of the liner.

A second major problem with all of these approaches is that they incorporate site designs that act like bathtubs. This may require some remedial action at some point to drain and treat the leachate that accumulates to ensure that leachate does not escape as overflow or breakthrough.

The following prior art is relevant to this invention:
U.S. Pat. No. 2,367,384 to Tymstra;
U.S. Pat. No. 2,937,142 to Rios;
U.S. Pat. No. 3,487,928 to Canevari;
U.S. Pat. No. 3,938,770 to Goodrich et al;
U.S. Pat. No. 4,033,764 to Colegate et al;
U.S. Pat. No. 4,231,866 to Moser et al;
U.S. Pat. No. 4,279,756 to Weiss et al;
U.S. Pat. No. 9,149,968 to Kupiec;
British Pat. No. 1,280,373 to Davies et al; and
Japanese patent application No. 015979 to Koyo Kasei KK.

More specifically, Tymstra describes a method for removing small quantities of water-imiscible organic oily impurities from water. The method consists of contacting the oily composition with an inert solid coated with a cation surface-active bonding agent. The solid employed may be beach sand, mud flat deposits, silt, clay, limestone, silica, rice hulls, etc. The cationic surface-active bonding agent may be quaternary ammonium, phosphonium, arsonium, or primary, secondary, or tertiary organic organic amines or saltss thereof.

Rios separates phenolic substances from aqueous solutions by contacting the aqueous solution with a clay absorbent. The clay is previously treated by depositing carbonaceous material thereon, and then subjecting it to combustion regeneration to burn off the carbonaceous material.

Canevari separates droplets of oil from an aqueous phase, using a mixture comprising a sodium montmorillonite clay and an organic cationic agent or glycol. The organic cationic agent is preferably an amine. The mixture is applied as a flocculating clarifying solution containing from 1 to 5% of clay to water, and an effective amount of the organic cationic agent or glycol.

Goodrich et al describes the use of an anionic polyelectrolyte and a sodium or a calcium montmorillonite clay to effectively separate water oil droplets in sea water.

Colegate et al describes scavenging metal ions from solution by means of a complexing agent comprised of an inorganic substrate, such as a clay mineral, with covalent organic molecules, such as onium compounds, chemically bonded to the substrate.

Kupiec describes the use of bentonite clays and portland cement in aqueous solutions containing polluting materials, e.g. metallic ions, to form a solid mass.

Moser et al separates organic and aqueous phases by treatment of the emulsions with diatomaceous earth at an elevated temperature.

Weiss et al describes the use of a finely divide particulate mineral or clay material, the individual particles of which have been treated to produce a thin hydroxylated surface layer having a positive zeta potential at the adsorption pH.

Davies et al describes the separation of an oil from an emulsion. Several methods are enumerated for forming the emulsion into two layers for evaporation of the aqueous layer. One of these methods utilizes a mixture of surface-active clay and a polyelectrolyte is added to the emulsion. Bentonite is described as particularly suitable polyelectrolytes.

Koyo Kasei KK describes the detoxification of PCB-containing waste water by mixing the waste water with diatomaceous earth, bentonite or other clay which has been made lipophilic, and then mixing with cement, water, and aggregate. In the method less than 20% PCB waster liquor, sludges, etc., are mixed with the diatomaceous earth, bentonite, or clay minerals of inorganic fine particles previously made lipophilic by surface treatment. The PCB's are allowed to be absorbed on the mineral, and then the resulting materials are mixed with cement, water, and aggregate. Diffusing or leaching appears to be reduced. Activated carbons or silica gel may also be used in place of the clay.

Additionally, organoclays are well-known in the art, see for example the following U.S. patents:

U.S. Pat. No. 2,531,427 to Hauser;
U.S. Pat. No. 2,966,506 to Jordan;
U.S. Pat. No. 3,422,185 to Kuritzkef;
U.S. Pat. No. 3,974,125 to Oswald;
U.S. Pat. No. 4,081,496 to Finlayson; and
U.S. Pat. No. 4,105,578 to Finlayson et al.

None of these aforementioned references teach or suggest the use of these organoclays to prevent the escape of organic waste material from a waste site.

SUMMARY AND OBJECTS OF THE INVENTION

The invention includes methods for containing and preventing escape of hazardous organic waste material using organoclay material. The hazardous organic waste material which may escape from a waste disposal site is substantially contained and controlled by sorbing substantially all of the hazardous organic waste material passing from the waste disposal site in an organoclay to contain and substantially prevent escape of the hazardous organic waste material to the environment.

It is thus an object of this invention to provide a method for treating fluid waste, e.g. pools, streams, etc. to contain the contaminate therein in a waste disposal site.

It is a further object of this invention to provide a method for treating both aqueous and polar fluid wastes containing organic contaminants.

DETAILED DESCRIPTION OF THE INVENTION

Figure 1:
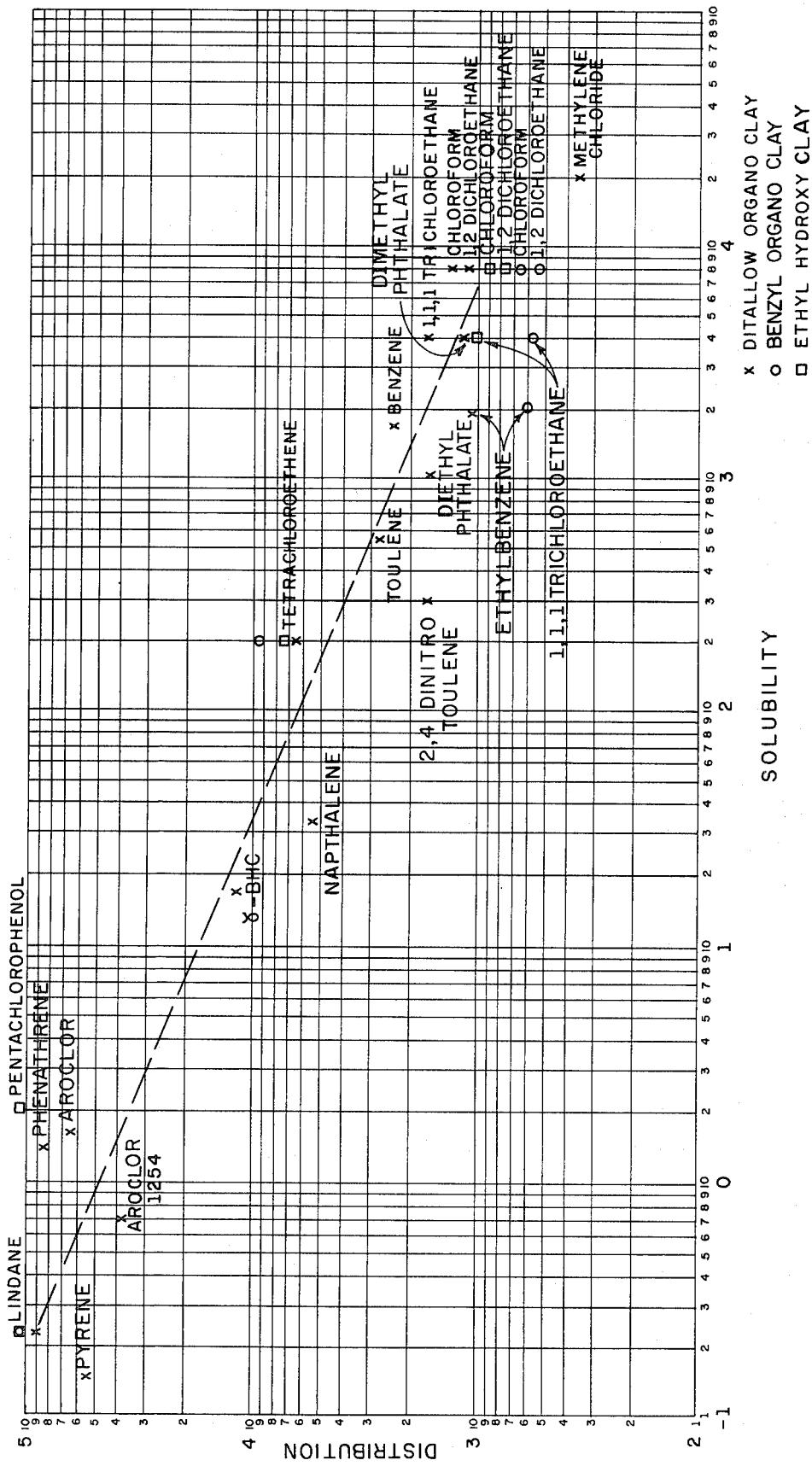
FIG. 1 is a graph showing the relationship of the logarithm of the distribution coefficients of priority organic compounds with the logarithm of their solubilities in water.

Organoclays are well known in the art as exemplified by the aforementioned patents to Hauser, Jordan, Kuritzkey, Oswald et al, Finlayson, and Finlayson et al, the entire disclosures of which are incorporated herein by reference. In this invention, the term "organoclay" refers to various clay types, e.g. smectites, that have organo ammonium ions substituted for cations between the clay layers. The term "organo ammonium ion substituted" refers to a substituted ammonium ion in which one or more hydrogen atoms are replaced by an organic group.

The organoclays are essentially solid compounds that have an inorganic and organic phase.

The preferred clay substrates for use in this invention are the smectite-type clays, particularly the smectite-type clays which have a cation exchange capacity of at least 75 milliequivalents per 100 grams of clay. Useful clays for such purposes include the naturally occuring Wyoming variety of swelling bentonite and similar clays, and hectorite, which is a swelling magnesium-lithium silicate clay. The clays, are preferably converted to the sodium form if they are not already in this form. This can be effected, by a cation exchange reaction with a soluble sodium compound. These methods are well-known in the art. Smectite-type clays prepared synthetically can also be utilized, such as montomorillonite, bentonite, beidelite, hectorite, saponite, and stevensite.

The organoclays useful in this invention include those set forth in U.S. Pat. No. 2,531,427 to Hauser. These organoclays are modified clays which exhibit in organic liquids, some of those characteristics which untreated clays exhibit in water. For example, they will swell in many organic liquids and will form stable gells and colloidal dispersions.

Generally, the quaternary ammonium salt substituted onto the clay has organic groups attached to the clay which will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 (i.e. dimethyl dioctododecyl 0:2, methyl benzyl dioctododecyl 1:2, dibenzyl dioctobenzyl 1:1, tribenzyl octadecyl 3:1, methyl dibenzyl octodecyl 2:1). The amount of alkyl ammonium salt substituted on the clay can vary between 0.5% to 50%.

In particular, the preferred organoclay used in this invention comprises one or more of the following quaternary ammonium cation modified montmorillonite clays:

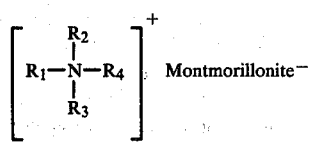

wherein $R_1$ is an alkyl group having at least 10 carbon atoms and up to, for example, 24 carbon atoms, and preferably having a chain length of from 12 to 18 carbon atoms; $R_2$ is hydrogen, benzyl or an alkyl group of at least 10 carbon atoms and up to, for example, 24 carbon atoms, and preferably from 12 to 18 carbon atoms; and $R_3$ and $R_4$ are each hydrogen or lower alkyl groups, viz., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(-hydrogenated tallow) ammonium bentonite; and more generally quaternary ammonium cation modified montmorillonite clays represented by the formula:

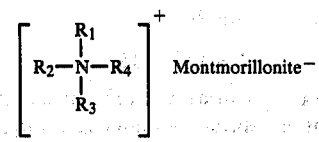

wherein $R_1$ is $CH_3$ or $C_6H_5CH_2$; $R_2$ is $C_6H_5CH_2$; and $R_5$ and $R_4$ are alkyl groups containing long chain alkyl radicals having 14 to 22 carbon atoms, and most preferably wherein 20 to 35% of said long chain alkyl radicals contain 16 carbon atoms and 60% to 75% of said long chain alkyl radicals contain 18 carbon atoms.

The montmorillonite clays which may be so modified are the principal constituents of bentonite rock, and have the chemical compositions and characteristics described, for example, in Berry and Mason, "Mineralogy", 1959, pp. 508–509. Modified montmorillonite clays of this type in (i.e. organoclays) are commercially available from Southern Clay Products, Inc., Gonzales, Tex. under such trade designations as CLAYTONE 34 and 40, and are available from NL Industries, Inc., New York, N.Y. under such trade designations as BENTONE 27, 34, and 38. The preferred organoclays utilized in this invention, are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methylbis (2-hydroxyethyl) octodecyl ammonium bentonite.

The fluid waste, which may be an aqueous waste or a waste fluid whose carrier fluid is a polar composition, e.g. aliphatic alcohol, etc. contains an amount of organic contaminant emulsified therein. Typical organic contaminants are the chlorinated organic compounds, e.g. DDT, BDD, DDE, 2,4-dichlorophenol tetrachloroethylene, and other organics such as benzene, toluene, methylene chloride, chloroform, 1,2 dichlorethane, 1,1,1-trichloroethane, trichloroethylene, tetrachloro ethylene, 2-nitrophenol, pentachlorophenol, dimethyl phthalate, Lindane, Arochlor-1254, ethyl benzene, HCP parathion, dichlorobenzene, hexachlorocyclopentadiene, ethylparathion, 2,4-dinitrotoluene, naphtalene, pyrene, etc.

Figure 2:
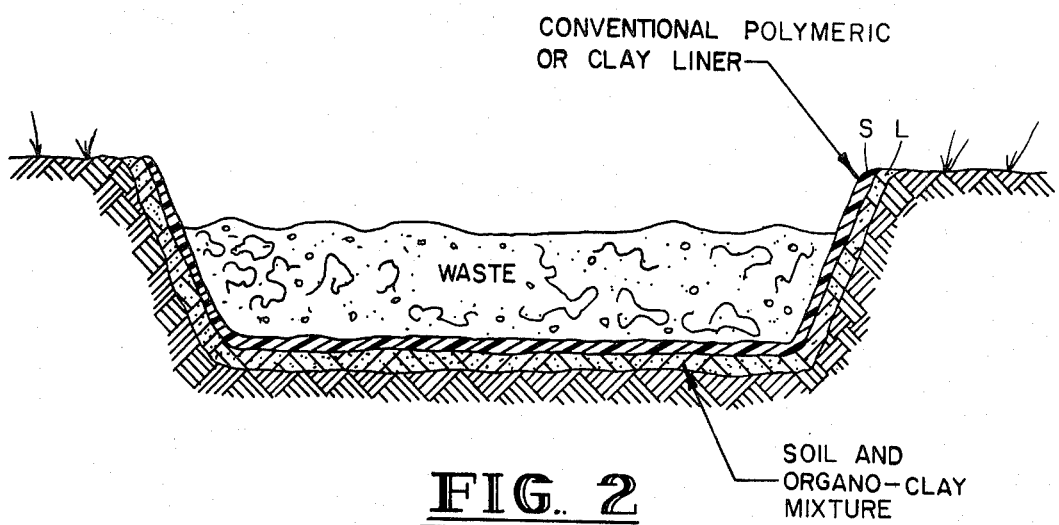
FIG. 2 shows a schematic cross-sectional view of a conventional disposal site configuration incorporating the organoclay invention as liner beneath a conventional impermeable liner system.

In the method of this invention, waste disposal sites are designed to use organoclays in at least two ways. The first approach as shown in FIG. 2, is to line the disposal site with a mixture of soil and organoclay L. The soil should be mixed with the organoclay at a rate of between about one and ten pounds of organoclay per square foot of soil. The soil and organoclay mixture can then be covered by a conventional impermeable liner system. This approach has the advantage of removing any organic compounds from the leachate that escape through the conventional synthetic or clay liner. It is understood that conventional excavating techniques, as well as conventional transporting and depositing techniques, are be used for the waste disposal system.

The approach shown in FIG. 2 may, in certain circumstances, suffer from the bathtub effect. This problem can be addressed by engineering passive organoclay filtering systems. These systems use large filtering beds of organoclay constructed such that the liner system of the waste disposal system acts as a leachate collection system for these filters. The leachate flowing through these beds has the organic material removed by the organoclay and thus the leachate is released safely into the ground water. These filter beds are easily monitored to determine when and if the filtering medium needs to be changed. This controlled release of leachate has significant advantages over previous systems of waste disposal.

Figure 3:
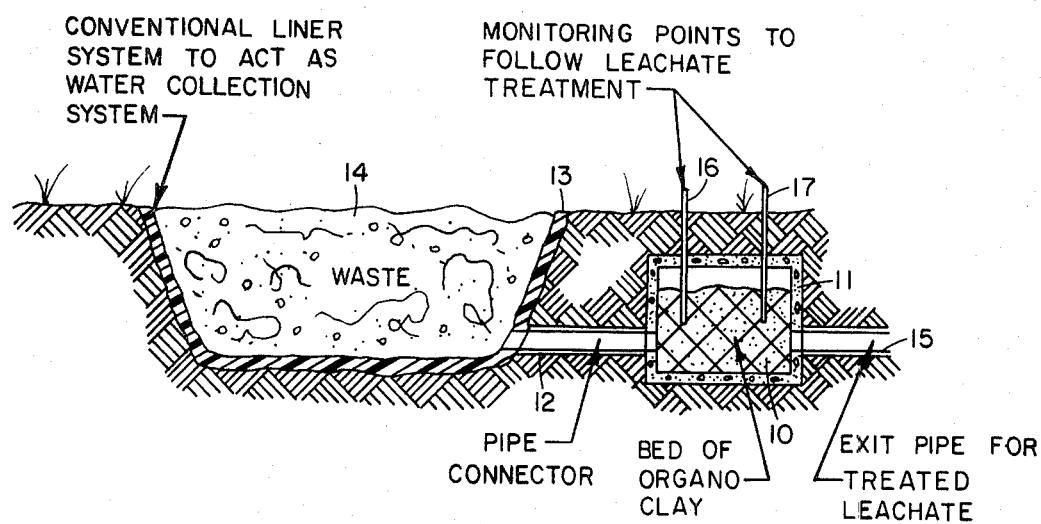
FIG. 3 shows a schematic cross-sectional view of a disposal site configuration using the organoclay invention as a filter bed treatment of waste leachate.

FIG. 3 illustrates a filtering system using a filter bed of organoclay 10. The bed of organoclay 10 is surrounded by a container or tank 11 which may be formed of concrete or other suitable material. The size of the container 11 and bed 10 is sufficient to handle the amount of leachate from the waste disposal system, which depends on the size of the system and the amount of water in or added to the system. The container 11 is connected by a pipe connector or conduit 12 to a conventional impermeable liner 13 of a waste disposal system. The waste material 14 is contained by the conventional liner system which acts as a water collection system. As a leachate collects in the waste, it is flowed through the pipe connector 12 to the bed 10 of organoclay. After sorbing of the organic molecules the filtered leachate exits through pipe 15, which conducts the organic-free leachate away from the waste disposal site. Suitable monitoring points or wells 16 and 17 are provided to determine when and if the filtering medium needs to be changed. This can be determined by withdrawing samples of the organoclay for testing.

Figure 4:
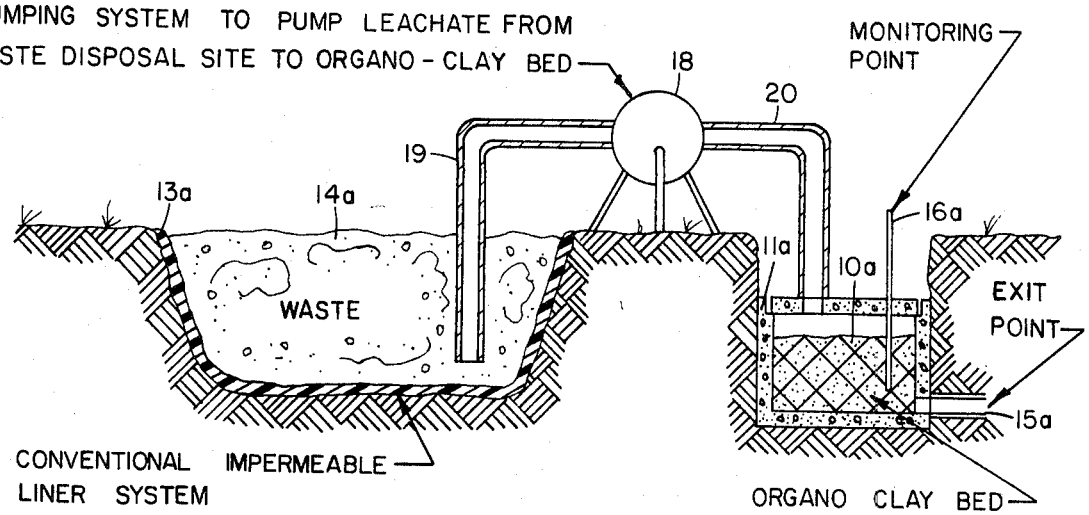
FIG. 4 shows a schematic cross-sectional view of a proposed disposal site configuration using the organoclay invention as filtering system for waste leachate.

Another type of filtering system for a waste disposal is shown in FIG. 4. The system includes a conventional impermeable liner system 13a for containing waste material 14a. A pumping system 18 (schemetically shown) is provided having an intake pipe 19 extending into the waste and an exit pipe 20 for flowing leachate into the organoclay bed 10a. The organoclay bed 10a is contained in a container or tank 11a. An exit pipe 15a is provided for the treated leachate. A monitoring means 16a is provided to determine when and if the filtering medium needs to be changed. The filtering system shown in FIG. 4 can easily be added to conventional waste disposal systems. The size of the filtering system is proportioned to the output of the waste disposal system.

Figure 5:
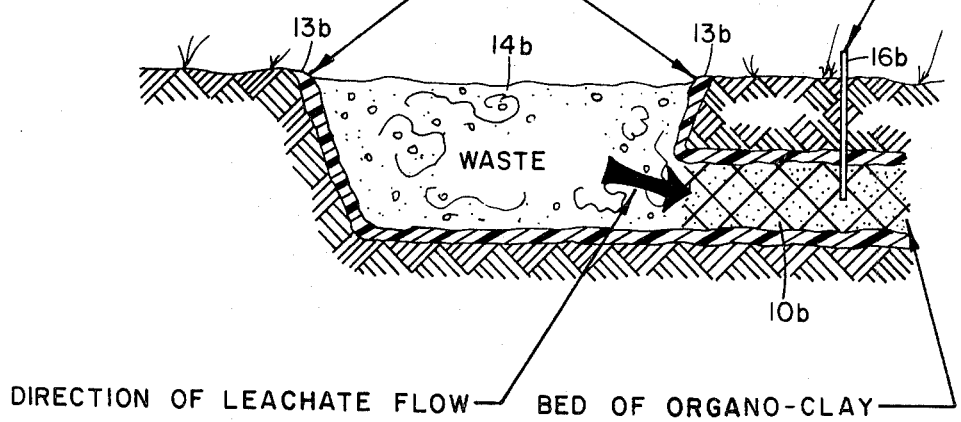
FIG. 5 shows a schematic cross-sectional view of a proposed disposal site configuration using the organoclay invention to remove organic material from existing waste leachate.

Another type of filtering system is shown in FIG. 5. In this system, a conventional liner system 13b is provided for containing the waste material 14b. A bed 10b of organoclay is provided for removing organic material from the leachate. The bed 10b can be in the form of a cylindrical or rectangular channel at a draining point for the waste disposal system. It may extend along the lower edge or a lower side of a waste disposal system. It is of sufficient size to trap all leachate from the waste disposal system. A monitoring well or point 16b is provided to determine when and if the filtering medium needs to be changed.

Figure 6:
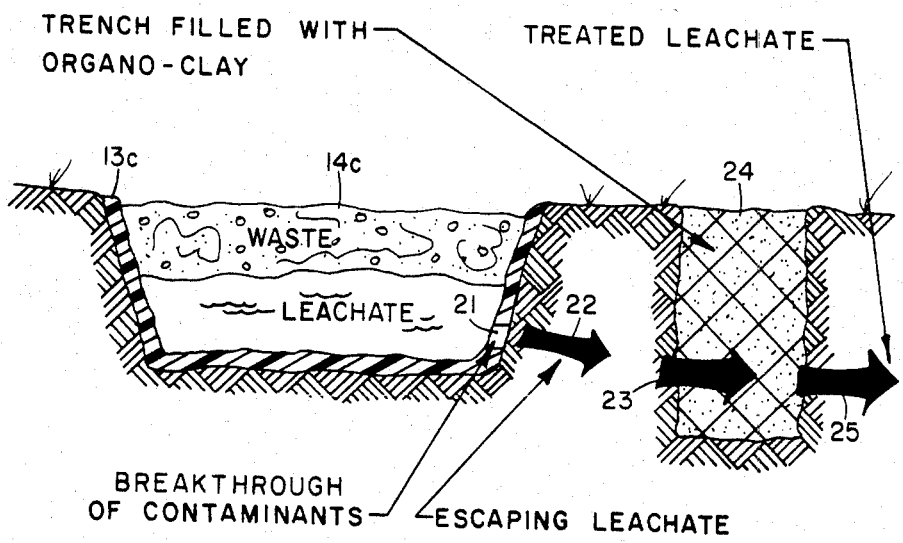
FIG. 6 shows a schematic cross-sectional view of a remedial use of the organoclay invention as a slurry trench to adsorb organic leakage from an existing waste disposal system.

In accordance with the invention; organoclays can also be used in other ways with existing waste disposal sites as a remedial measure. For a landfill that is leaking and contaminating ground water, the organoclay can be applied in several ways. The first way is in the form of a slurry wall or trench. A waste disposal system incurring leakage is shown in FIG. 6. The waste disposal system includes a conventional impermeable liner system 13c for containing waste material 14c. A breach of the liner system is schematically shown in the form of a hole 21 in the liner system. Escaping leachate represented by the arrows 22 and 23 migrates to the slurry wall 24 which is composed of organoclay. The slurry wall is a trench filled with the organoclay. As the leachate flows through the trench 24 filled with the organoclay, the organic materials are sorbed by the organoclay such that the leachate 25 exiting the trench 24 is treated to avoid polluting water with organic compounds.

Figure 7:
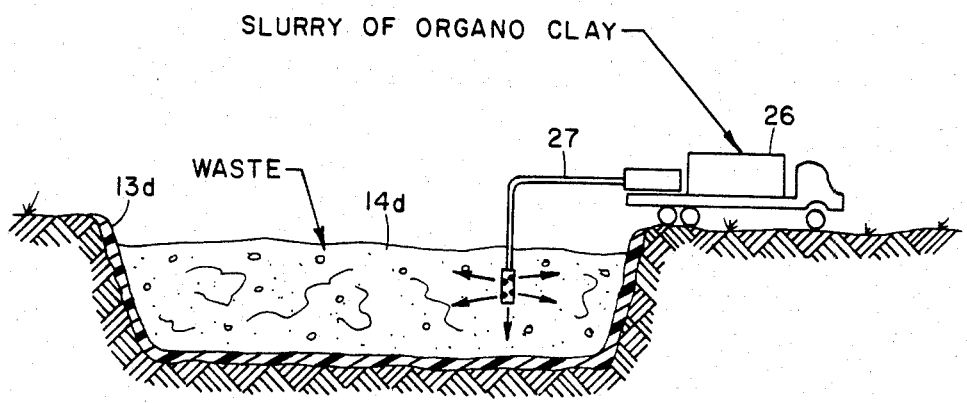
FIG. 7 shows a schematic cross-sectional view of a remedial use of the organoclay invention as directly injected into a waste disposal site to immobilize organic waste.

Another way the organoclay can be used as a remedial measure is by directly injecting it into the waste disposal site to immobilize the organic waste. This is schematically illustrated in FIG. 7 which shows a source 26 of a slurry of organoclay which is pumped through a line 27 into the waste material 14d. The waste material 14d is contained by an impermeable liner 13d.

Figure 8:
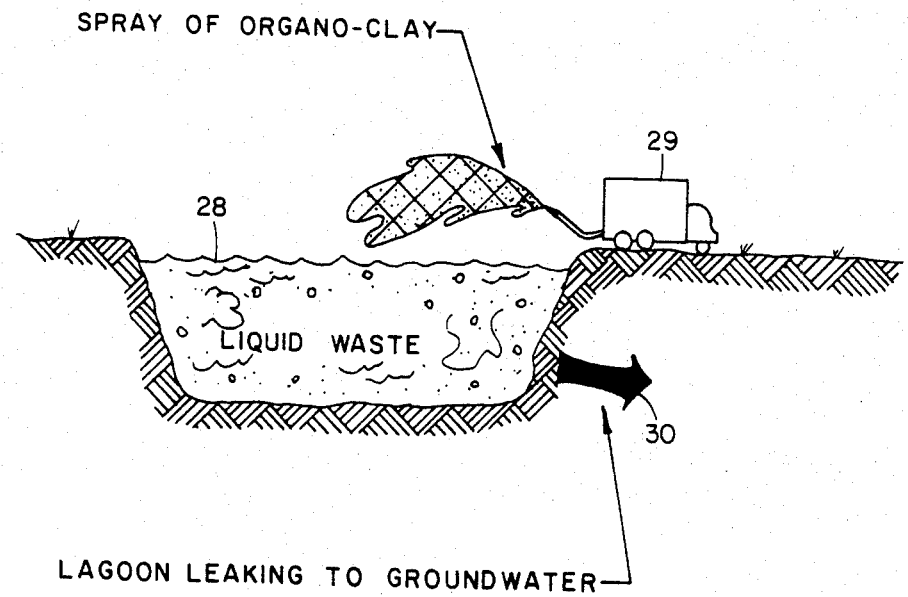
FIG. 8 shows a schematic cross sectional view of application of the organoclay invention utilizing dry spraying onto the surface of a waste lagoon to form a liner upon settling and to stop waste leakage from the area.

In accordance with the invention, organoclays can also be applied to waste lagoons and on organic materials such as petroleum on water or land. This can be accomplished by spraying clay on the surface of the organic material and allowing the clay to settle or sorb the organic material. This is schematically shown in FIG. 8 which shows a liquid waste lagoon 28 without a liner, although it could have a standard impermeable liner. A leak is schematically illustrated by the arrow 30. A spray mechanism 29 is provided for spraying the organoclay material onto the organic material or liquid waste. The organoclay will sorb the organic compounds from the aqueous phase. It will also settle to the bottom of a lagoon as shown in FIG. 9 to form an impermeable layer or liner 31 to the waste flow so that the leak is stopped.

Figure 9:
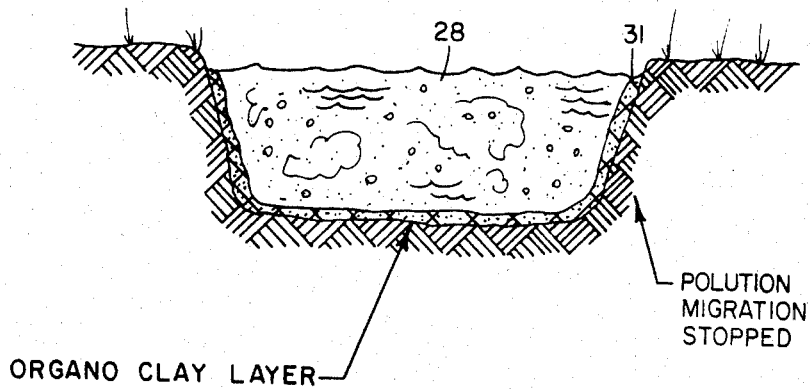
FIG. 9 shows a schematic cross sectional view of the organoclay invention settled at the bottom of a waste lagoon forming an impermeable barrier and sorbing organic waste materials.

The invention as shown in FIGS. 8 and 9 has certain distinct advantages. The system acts as an impermeable barrier to ground water flow because of the organoclay's swelling properties. This is very important since it can stop or retard ground water flow into the disposal area and also retard migration of the organic waste from the disposal site. The organoclay will also retard the migration of the organic waste by the partition mechanism previously described. This is an extreme improvement over current liners which only form physical barriers to waste migration.

The organoclay, upon mixing in the fluid waste, swells as the organic contaminant molecules are sorbed into and on to the organoclay. The organoclay additionally fixes the organic contaminant compounds through absorption involving partitioning of the organic molecules of the contaminant into the organoclay.

The organic molecules of the contaminant preferably partition into the organic phase of the organoclay versus the aqueous phase or polar fluid phase of the fluid. The magnitude of organic partitioning of a given organic molecule into the organoclay over, for example, the aqueous phase can be predicted qualitatively by the solubility of the organic molecule in the aqueous phase. That is to say, an organic molecule that is very insoluble, e.g. oil, in an aqueous phase will partition very strongly into the organoclay relative to a more soluble organic molecule. This partitioning phenomenon also follows chromatagraphic theory which allows precise predictions of how organic molecules will migrate through a bed of organoclay. FIG. 1 shows the linear relationship of distribution coefficients for several key organic species with three forms of organoclay. The distribution coefficients equals the amount of organic adsorbed in the clay divided by the amount left in solution times the volume of the solution divided by the mass of the clay. The aqueous solution contains the organics listed in FIG. 1. Generally, the amount in solution depends on solubility.

EXAMPLE I

In order to demonstrate the efficacy of the organoclay used in this invention, several batch sorption experiments were performed with two forms of dimethyl organoclay and compared to sorbtion by an unmodified montmorillonite. These were conducted with 100:1 solution to solid ratio. The following Tables 1, 2 and 3 are a summary of these studies showing results from batch equilibration sorbtion studies of an unmodified montmorillonite, CLAYTONE® 34 and CLAYTONE® 40 respectively. CLAYTONE® 34 and CLAYTONE® 40 are organoclays, each being a dimethyl di(hydrogenated tallow) ammonium bentonite products, available from Southern Clay Products, Inc. of Gonzales, Tex.

It can be seen that extremely efficient removal occurs for all of the listed organics with the organoclays. The analyses for the majority of compounds in Tables 1, 2 and 3 were conducted by standard gas chromatographic techniques. The data for benzene, toluene and methylene chloride in these Tables are less accurate because the measurements were conducted by determining only the total organic carbon concentration.

TABLE 1

| Organic Species | Inlet Concentrations Spiking Level (ppb) (μg/l) | Concentration in Blank (ppb) (μg/l) | 24 hours Batch Equilibrations Concentration | | | 48 Hours Batch Equilibration Concentration | | |
|---|---|---|---|---|---|---|---|---|
| | | | Amount Recovered (ppb) (μg/l) | Blank (ppb) (μg/l) | % Sorbed | Amount Recovered (ppb) (μg/l) | Blank (ppb) (μg/l) | % Sorbed |
| Aroclor 1254 | 3.65 | 0 | 4.95 | 0 | 0 | 13 | 0 | 0 |
| p,p'-DDT | 0.88 | 0 | 0.82 | 0 | 7 | 0.96 | 0 | 0 |
| o,p'-DDT | 1.77 | 0 | 2.11 | 0 | 0 | 2.16 | 0 | 0 |
| p,p'-DDD | 0.75 | 0 | 0.75 | 0 | 0 | 0.88 | 0 | 0 |
| o,p'-DDD | 0.43 | 0 | 0.46 | 0 | 0 | 0.36 | 0 | 16 |
| o,p'-DDE | 0.17 | 0 | 0.20 | 0 | 0 | 0.15 | 0 | 12 |
| 2,4-Dichlorophenol | 18,000 | 0 | 11,000 | 0 | 39 | 11,000 | 0 | 39 |
| Tetrachlorethylene | 318 | 0.20 | 278 | 2.10 | 13 | 331 | 0.70 | 0 |
| Benzene | $1.35 \times 10^5$ | 0 | $1.35 \times 10^5$ | 0 | 0 | | | |
| Toluene | $5.4 \times 10^4$ | 0 | $4.54 \times 10^4$ | 8 | 16 | | | |
| Methylene Chloride | $5.12 \times 10^5$ | 0 | $4.40 \times 10^5$ | 0 | 14 | | | |

TABLE 2

| Organic Species | Inlet Concentrations Spiking Level (ppb) (μg/l) | Concentration in Blank (ppb) (μg/l) | 24 Hours Batch Equilibrations Concentration | | | 48 Hours Batch Equilibration Concentration | | |
|---|---|---|---|---|---|---|---|---|
| | | | Amount Recovered (ppb) (μg/l) | Blank (ppb) (μg/l) | % Sorbed | Amount Recovered (ppb) (μg/l) | Blank (ppb) (μg/l) | % Sorbed |
| Aroclor 1254 | 3.65 | 0 | 0 | 0 | 100 | 0 | 0 | 100 |
| p,p'-DDT | 0.88 | 0 | 0 | 0 | 100 | 0 | 0 | 100 |
| o,p'-DDT | 1.77 | 0 | 0 | 0 | 100 | 0 | 0 | 100 |
| p,p'DDD | 0.75 | 0 | 0 | 0 | 100 | 0 | 0 | 100 |
| o,p'DDD | 0.43 | 0 | 0 | 0 | 100 | 0 | 0 | 100 |
| p,p'-DDE | 0.56 | 0 | 0 | 0 | 100 | 0 | 0 | 100 |
| o,p'-DDE | 0.17 | 0 | 0 | 0 | 100 | 0 | 0 | 100 |
| 2,4-Dichlorophenol | 18,000 | 0 | 200 | 0 | 99 | 200 | 0 | 99 |
| Tetrachloroethylene | 318 | 0.20 | 25 | 0.3 | 92 | 24 | 0.2 | 92 |
| Benzene | $13.5 \times 10^5$ | 0 | 5400 | 0 | 96 | | | |
| Toluene | $5.4 \times 10^4$ | 0 | 2160 | 0 | 96 | | | |
| Methylene Chloride | $5.12 \times 10^5$ | 0 | $1.08 \times 10^5$ | 0 | 79 | | | |

TABLE 3

| Organic Species | Inlet Concentrations Spiking Level (ppb) (μg/l) | Concentration in Blank (ppb) (μg/l) | 24 Hours Batch Equilibrations Concentration | | | 48 Hours Batch Equilibration Concentration | | |
|---|---|---|---|---|---|---|---|---|
| | | | Amount Recovered (ppb) (μg/l) | Blank (ppb) (μg/l) | % Sorbed | Amount Recovered (ppb) (μg/l) | Blank (ppb) (μg/l) | % Sorbed |
| Aroclor 1254 | 3.65 | 0 | 0 | 0 | 100 | 0 | 0 | 100 |
| p,p'-DDT | 0.88 | 0 | 0 | 0 | 100 | 0 | 0 | 100 |
| o,p'-DDT | 1.77 | 0 | 0 | 0 | 100 | 0 | 0 | 100 |
| p,p'DDD | 0.75 | 0 | 0 | 0 | 100 | 0 | 0 | 100 |
| o,p'DDD | 0.43 | 0 | 0 | 0 | 100 | 0 | 0 | 100 |
| p,p'-DDE | 0.56 | 0 | 0 | 0 | 100 | 0 | 0 | 100 |
| o,p'-DDE | 0.17 | 0 | 0 | 0 | 100 | 0 | 0 | 100 |
| 2,4-Dichlorophenol | 18,000 | 0 | 200 | 0 | 99 | 200 | 0 | 99 |
| Tetrachloroethylene | 318 | 0.20 | 27 | 0.3 | 92 | 25 | 0.30 | 92 |
| Benzene | $1.35 \times 10^5$ | 0 | 3420 | 0 | 76 | | | |
| Toluene | $5.4 \times 10^4$ | 0 | 1620 | 0 | 97 | | | |
| Methylene Chloride | $5.12 \times 10^5$ | 0 | $1.13 \times 10^5$ | 0 | 78 | | | |

EXAMPLE II

The following Table 4 gives an initial comparison of literature values of sorption capacities of activated charcoal for several organic compounds and sorption capacities from experimental data for the dimethyl di(hydrogenated tallow) form of the organoclay for these organic compounds. The data for charcoal was taken from EPA Report 600/8-80-23 and for the organoclay from data based on single experimental value per compound.

TABLE 4

| | Sorption Capacities (mg/g) | |
|---|---|---|
| Organic Compound | Charcoal | Organoclay |
| Benzene | 0.1 | 18 |
| Toluene | 25.0 | 6 |
| Methylene Chloride | 1.2 | 49 |

EXAMPLE III

The superiority of the organoclay for sorption of organics was further investigated. The sorption of three forms of organoclay at various loading rates for 12 priority organics were compared with activated charcoal in laboratory experiments and these results are shown in the following Table 5.

TABLE 5

| Concentration of Organic μg/l (ppb) | Clay Type Clay Dose (mg/L): | Dimethyl Benzyl (Hydrogenated Tallow) Ammonium Bentonite | | | Dimethyl Di(hydrogenated tallow) Ammonium Bentonite | | | Methylbis (2-hydroxyethyl) Octodecyl Ammonium Bentonite | | | Carbon |
|---|---|---|---|---|---|---|---|---|---|---|---|
| | | 130 | 660 | 1300 | 130 | 660 | 1300 | 130 | 660 | 1300 | 130 |
| 1,000 | Chloroform | 64 | 49 | 56 | 47 | 55 | 43 | 42 | 49 | 51 | 27 |
| 1,000 | 1,2 Dichloroethane | 46 | 36 | 50 | 48 | 49 | 42 | 34 | 29 | 36 | 40 |
| 1,000 | 1,1,1 Trichlorethane | 60 | 55 | 54 | 40 | 49 | 40 | 36 | 43 | 45 | 30 |
| 1,000 | Trichloroethylene | 27 | 24 | 25 | 12 | 43 | 9 | 5 | 13 | 22 | 86 |
| 1,000 | Tetrachlorethylene | 85 | 46 | 74 | 47 | 51 | 74 | 11 | 39 | 60 | 92 |
| 700 | 2 Nitrophenols | 84 87 | 99 96 | ND | 27 | 92 87 | 97 94 | 49 84 | 91 95 | 97 96 | 85 |
| 750 | Pentachlorophenol | ND | ND | ND | ND | ND | ND | ND 94 | 92 | ND | 94 |
| 400 | Dimethyphthalate | 85 | ND | ND | 92 94 | ND | ND | 70 | ND | ND | 92 |
| 400 | Lindane | 99.7 93 | ND | ND | 99.9 85 | ND 98 | ND | 99.9 | ND | ND | — |
| 100 | Arochlor 1254 | 40 29 | 90 88 | 95 94 | 88 77 | 98 90 | 98 95 | 81 74 | 84 65 | 92 89 | 99.7 |
| 15 | Ethyl Benzene | 29 | 16 | 22 | 13 | 24 | 71 | 8 | 16 | — | — |

ND = Not Detected

EXAMPLE IV

Figure 10:
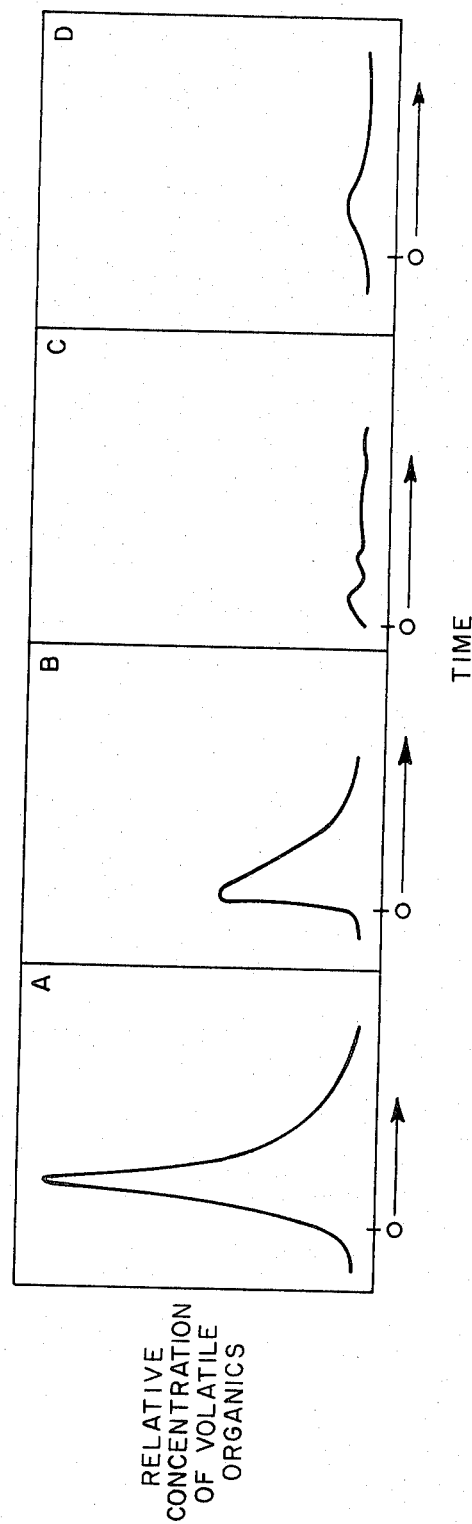
FIG. 10 shows organic emissions from simulated landfarm disposal of petroleum study.

Volatile organics emanating from landfarm disposal of petroleum sludge can be reduced by application of organoclays in accordance with the invention. FIG. 14 illustrates initial emissions from an untreated landfarm waste in soil and landfarm waste which was treated in soil with a thin layer of organoclay sprinkled onto the waste burdened surface in portions A and B, respectively. The magnitude of these emissions results from physically disturbing the landfarmed waste by disking or tilling, a normal commercial practice. FIG. 10, portions C and D, illustrate the volatile organic concentration results from tilling the organoclay treated surface 24 and 72 hours after treatment. It can be seen that after the first disking, the emissions were reduced essentially to background levels. For up to ten days after the initial waste implacement, this same low level quantity of emissions occured even when the landfarm was disked repeatedly. Applications of organoclay also tends to solidify the waste-burdened surface producing a mechanically superior surface. Vehicles are able to travel over the organoclay treated area sooner after the waste was applied; currently, industrial landfarm operations are delayed about three days between waste applications to ensure that stable surface for heavy equipment are regained. It is not uncommon for the landfarm vehicles to become stuck in areas where the wastes are not percolating into the soil rapidly enough to accommodate a mechanically stable surface, and application of organoclay to these surfaces alleviates this situation.

While the present invention has been particularly set forth in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A method for preventing escape of organic contaminant material, comprising the steps of:
   collecting the organic waste material at a waste disposal site;
   substantially containing and preventing release of hazardous organic waste material from the waste disposal site; and
   sorbing substantially all of the hazardous organic waste material passing from the waste disposal site in an organoclay to substantially prevent escape of the hazardous organic waste material to the environment, said organoclay being the previously prepared reaction product of a quaternary ammonium salt and a smectite-type clay.

2. The method as set forth in claim 1 including the step of:
   forming a liner containing an organoclay around the waste disposal site to substantially prevent escape of any hazardous organic waste material from the site and sorb the escaping waste material.

3. The method as set forth in claim 1 including the step of:
   substantially containing the waste at the waste disposal site using an inmpermeable liner system.

4. The system as set forth in claim 1 including the steps of:
   flowing leachate from the waste disposal site to a filtering means containing organoclay to remove hazardous organic waste from the leachate.

5. The method as set forth in claim 1, wherein the organoclay is formed of a solid compound having an inorganic and organic phase which will sorb organic molecules.

6. The method as set forth in claim 1, wherein the clay substrate for the organoclay is a clay type forming a suitable organic clay complex using bentonite, hectorite, or attapulgite as a clay substrate.

7. The method as set forth in claim 1, wherein the organoclay includes a quaternary ammonium salt which is substituted onto the clay.

8. The method set forth in claim 7, wherein the quaternary ammonium salt has organic groups attached selected from the group consisting of aliphatic hydrocarbon chains varying from 1 to 20 carbons and aromatic organic molecules.

9. The method of claim 8, wherein the amount of organoclay is a maximum of about 10% by weight of the amount of organic composition.

10. The method as set forth in claim 9, wherein the organic material is an aqueous solution.

11. The method as set forth in claim 9, wherein the solidifying material is added to the organic material and organoclay to form a solid material containing the organic material sorbed into the organoclay.

12. The method of claim 7, wherein the amount of organoclay is a maximum of about 10% by weight of the amount of organic composition.

13. The method of claim 1, wherein the organoclay is a higher dialkyl dimethyl ammonium organoclay.

14. The method of claim 1, wherein the organoclay is a benzyl ammonium organoclay.

15. The method of claim 1, wherein the organoclay is an ethylhydroxy ammonium organoclay.

16. The method of claim 1, wherein the amount of organoclay is at least about 1% by weight of the amount of organic contaminant.

17. The method of claim 1, wherein the amount of organoclay is at least about 5% by weight of the amount of organic contaminant.

18. A method of controlling and limiting migrations of organic material into the environment, comprising the steps of:

bringing a predetermined amount of organoclay into contact with an organic material, said organoclay being the previously prepared reaction product of a quaternary ammonium salt and a smectite-type clay sorbing the organic material into the organoclay; and containing the organoclay and sorbed organic material to control and limit migration of the organic material into the environment.

* * * * *